United States Patent
Burdon

(10) Patent No.: US 6,865,452 B2
(45) Date of Patent: Mar. 8, 2005

(54) QUIET MODE OPERATION FOR COCKPIT WEATHER DISPLAYS

(75) Inventor: David Burdon, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 86 days.

(21) Appl. No.: 10/233,029

(22) Filed: Aug. 30, 2002

(65) Prior Publication Data

US 2004/0044445 A1 Mar. 4, 2004

(51) Int. Cl.[7] .................................................. G06F 7/00
(52) U.S. Cl. ................................. 701/3; 701/10; 701/14
(58) Field of Search ............................. 701/3, 9, 10, 14, 701/4; 340/961, 968, 970, 949, 963, 905; 342/26, 65, 357.06, 357.13

(56) References Cited

U.S. PATENT DOCUMENTS 6,577,947 B1 * 6/2003 Kronfeld et al. ............ 701/202
6,590,529 B2 * 7/2003 Schwoelger ........... 342/357.06
6,603,405 B2 * 8/2003 Smith ......................... 340/905
6,653,947 B2 * 11/2003 Dwyer et al. ............... 340/970

* cited by examiner

Primary Examiner—Richard M. Camby

(57) ABSTRACT

An airborne computer is linked to a ground-based or satellite-based supplier of weather data that is geographically referenced. The computer retrieves the weather data on a regular cycle but does not display the data. The computer also has access to the aircraft's state, i.e., position, altitude, speed, and intended route. Algorithms within the computer combine the present and estimated future positions of the aircraft with the weather data, and create an alert to the crew if a threat is detected. When a threat is detected, the weather display is activated to draw the attention of the crew to the threat.

23 Claims, 4 Drawing Sheets

QUIET MODE OPERATION FOR COCKPIT WEATHER DISPLAYS

TECHNICAL FIELD

The present invention relates to a display for a vehicle, and more particularly to a display for depicting hazards in the path of the vehicle.

BACKGROUND OF THE INVENTION

Modern displays, particularly those used in aircraft for flight planning and monitoring, are capable of displaying a considerable amount of information such as flight planning information and terrain information The terrain information consists of situational awareness (SA) terrain and terrain cautions and warnings that, among other things, may indicate where the aircraft may potentially impact terrain. The flight planning information consists of flight path information, altitude information and other information useful to a pilot or crewmember in following and anticipating the path and altitude of the aircraft over the ground.

Weather information can also be delivered to a weather display in the cockpit. The weather display can be dedicated to this function or may be used for several other operations as set forth above. When weather data is graphically displayed in an aircraft cockpit, the weather data requires concentrated attention by the aircrew to assess potential weather threats. Weather data (particularly from a ground or satellite based source rather than weather radar), is periodically refreshed at intervals ranging from a few minutes to several hours, depending on the region and data set. Further, weather displays are typically colorful, bright, and changing to help the crew distinguish between light and severe weather. When such bright and colorful weather displays are in a peripheral view (relative to the main flight instrumentation), it can be distracting to the pilot and crew.

It would be useful, therefore, to provide a weather display system that does not require continuous monitoring by a pilot or crew in order to detect potential threats of bad weather and which avoids crew distractions when weather is not severe.

When the weather display is a part of an integrated flight display system operating in a shared mode with other flight and navigation functions, it would be useful to provide a mechanism for alerting the crew to specified weather conditions even though the display is being used in other modes.

BRIEF SUMMARY OF THE INVENTION

The above and other problems are addressed by providing an airborne computer linked to a ground-based or satellite-based supplier of weather data that is geographically referenced. The computer retrieves the weather data on a regular cycle but does not display the data. The computer also has access to the aircraft's state, i.e., position, altitude, speed, and intended route. Algorithms within the computer combine the present and estimated future positions of the aircraft with the weather data, and create an alert to the crew if a threat is detected. When a threat is detected, the weather display is activated to draw the attention of the crew to the threat.

BRIEF DESCRIPTION OF THE DRAWINGS

The present invention will hereinafter be described in conjunction with the appended drawing figures, wherein like numerals denote like elements, and.

DETAILED DESCRIPTION OF PREFERRED EXEMPLARY EMBODIMENTS

Figure 1:
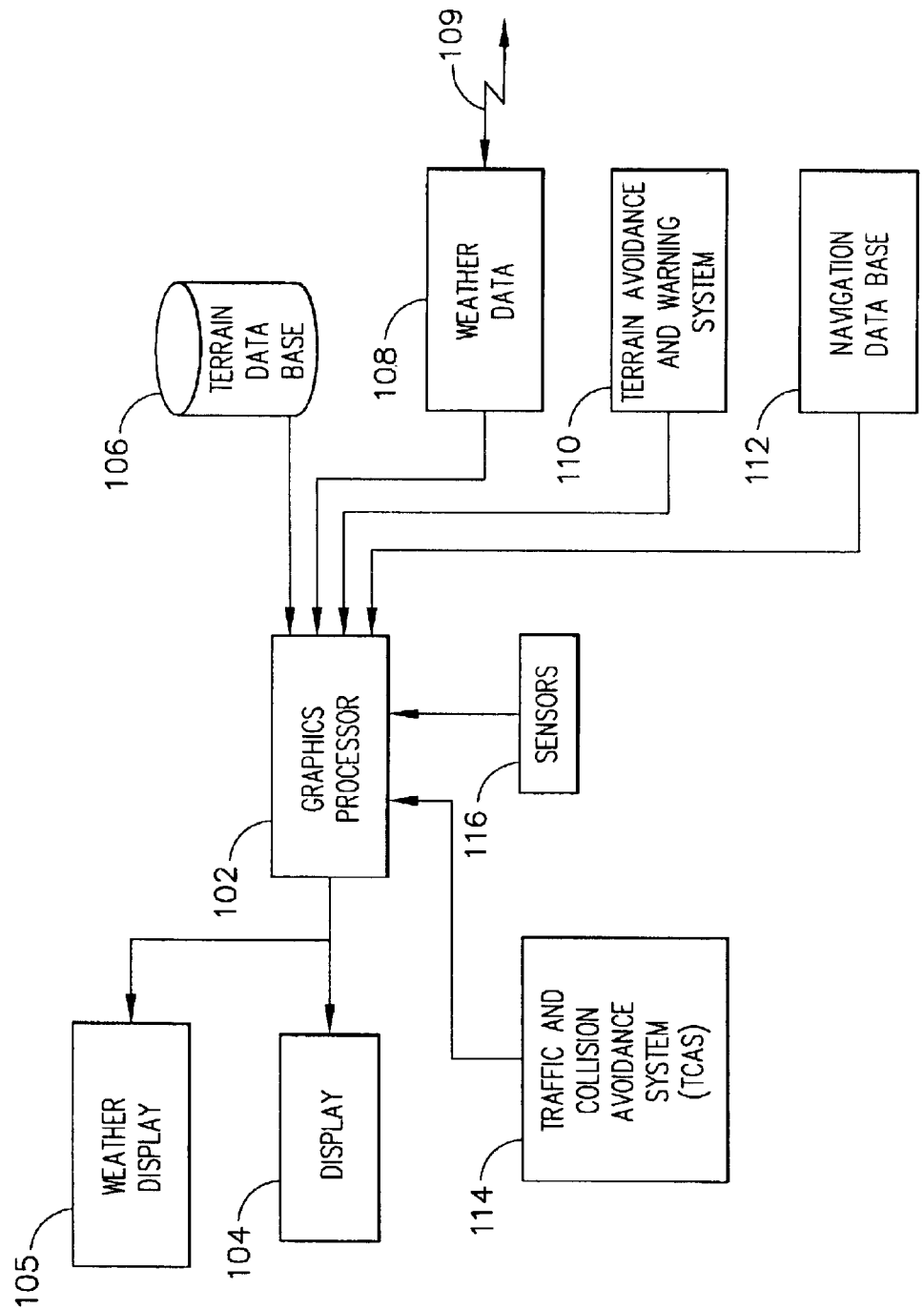
FIG. 1. is a block diagram of an integrated flight display system usable with the instant invention.

The following detailed description of a preferred embodiment is merely exemplary in nature and is not intended to limit the invention or the application and uses of the invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, lookup tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed.

It should be appreciated that the particular implementations shown and described herein are illustrative of the invention and its best mode and are not intended to otherwise limit the scope of the invention in any way.

In FIG. 1, an exemplary flight management display system includes a graphics processor 102 configured to provide information to a display element or monitor 104. One or more data sources are coupled to the processor 102. These data sources may be, but are not limited to, a terrain database 106, a weather data source 108 from an on-board weather radar unit or by a telecommunications link 109 from an external weather data source such as a ground-based weather data source or a satellite weather data source, a terrain avoidance and warning system (TAWS) 110, a navigation data base 112, a traffic and collision avoidance system (TCAS) 114 and other sensors 116 which may provide additional useful information to a user, such as aircraft airspeed, position, altitude, and the like. Additionally, sensors 116 may include inertial sensors or a GPS (Global Positioning System) that is capable of providing several of the described inputs, such as aircraft speed, position, and altitude.

A number of aspects of display element 104(which are controlled by processor 102 in a practical embodiment) may contribute to the improved contents and appearance of the display, thus increasing the situational and terrain awareness of the pilot and/or flight crew. The image generation and display aspects may leverage known techniques such that existing display systems can be modified in a straightforward manner to support the different features described herein. In a practical implementation, the concepts described herein may be realized in the form of revised display generation software or processing resident at processor 102.

Processor 102 typically encompasses one or more functional blocks used to provide a flight management, navigational, weather, terrain, and positional interface with the pilot, and input to display element 104. Processor 102 may include or cooperate with a mode, position and/or detection element that is capable of determining the mode or position of the vehicle relative to one or more reference locations, points, planes, or navigation aids. In addition, processor 102 may be configured to receive, analyze, condition, and process navigation and positional information, including flight path information as well as wither information associated with the vehicle. In this regard, processor 102 may include any number of individual microprocessors, flight computers, navigation equipment, memories, storage devices, interface cards, and other standard components known in the art. Moreover, processor 102 may include any number of microprocessor elements, memory elements, power supplies, and other functional components as necessary to support the operation of the display system 100. In this respect, processor 102 may include or cooperate with any number of software programs or instructions designed to carry out various methods, process tasks, calculations, control functions, and the generation of display signals and other data used by display element or monitor 104. For example, processor 102 may be configured to generate an annunciator associated with the position of the aircraft relative to at least one reference location, to generate windows corresponding to user inputs, to combine inputs from various sensors to create a data stream for presentation to the display element 104, and the like.

Processor 102 may also be suitable configured to receive and process navigational data 112 related to an intended flight path and destination of the aircraft. In a practical commercial aircraft application, such navigational data 112 may be associated with specific waypoints, airports, navigational aids, or the like. As described in more detail below, processor 102 may process data from any of the data inputs shown above and generate appropriate signals to display element 104 such that display element 104 generates indicia representative of the appropriate navigational, weather, terrain, or other information, or the like. Such processors and flight control computers are available from a number of manufacturers such as Honeywell International Inc. In an exemplary embodiment, processor 102 is incorporated within a flight management system (FMS) or another avionics component that, inter alia, formats navigation data and forwards the data to monitor 104 for display as data on display 104.

Display element 114 may include any display element suitable for displaying the various symbols and information detailed below. Many currently known monitors are suitable for this task, including various CRT and flat-panel display systems. Display element 104 may be based on a panel mounted display, a HUD projection, or any known technology. In an exemplary embodiment, display element 104 includes a panel display. Display element 104 suitably includes various graphical elements associated with the environment of the aircraft including the location of various navigational aids including VHF Omnirange stations (VORs), non-directional beacons, radio stations, and the like, and airports, airways, special use airspace, and other aircraft. In aircraft having a separate weather display, an alternate display monitor 105 may be provided.

In operation, the graphics processor 102 obtains data (position, speed direction) from the sensors 116. Based on the inertial or GPS data, the graphics processor 102 obtains terrain data and navigation data from the data bases 106, 112. These data bases are typically onboard the aircraft, but need not be limited to such a design. The graphics processor 102 renders a picture of the absolute terrain, and the navigation data (VORs, airports, airways, etc) and flight path is also rendered on the display element 104. The TAWS 110 provides data to the graphics processor 102 regarding the location of terrain that may be a threat to the aircraft. The graphics processor 102 may show the potential threat terrain in various colors depending on the level of threat: red for warnings (immediate danger), yellow for cautions (possible danger), and green for terrain that is not a threat Of course, other colors and different numbers of levels of threat can be provided as a matter of choice.

The integrated flight display system of FIG. 1 is shown as a preferred embodiment, since many aircraft of the business or airline categories have such integrated flight display system on board.

Figure 2:
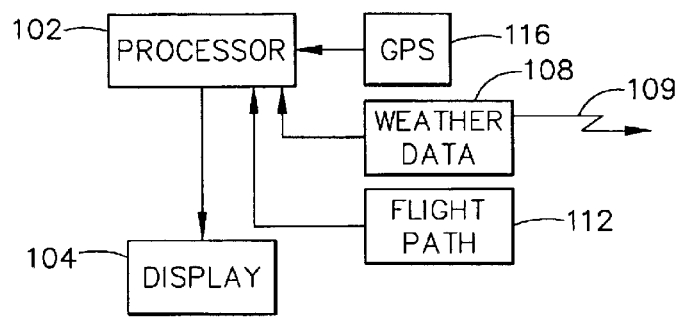
FIG. 2. is a block diagram of a stand-alone computer display system usable with the instant invention.

It is possible, however to provide a simplified weather display system performing as a separate cockpit processor. Such a system is shown in FIG. 2 and comprises a computer or processor 102 (similar components in FIG. 2 are given the same numbers as their counterpart components of FIG. 1, although it is understood that the system of FIG. 1 incorporates many more function than that of FIG. 2). Processor 102 of FIG. 2 may simply comprise a typical laptop computer that could be carried by a crewmember from aircraft to aircraft, or it could be a stand-alone computer on an aircraft with an integrated display system and dedicated to this one task or several other tasks.

Interfaced to the processor 102 is a GPS or other device capable of relating the groundspeed, altitude, and position of be aircraft. This component is similar to the sensors 116 of FIG. 1 and, as previously described, one of the sensors 116 of FIG. 1 may well be a GPS receiver. Other inputs to the processor 102 of FIG. 2 include a source of weather information 108 which may be obtained, for example, through a telecommunications link 109 to a ground station or satellite.

Flight path information is provided by a navigation database 112 or by a crewmember entry of flight data directly into the processor 102. The display 104 of FIG. 2 may be the processor's display itself (as in the case of a laptop computer) or a separate display in the event the processor 102 has no integral display.

Figure 3:
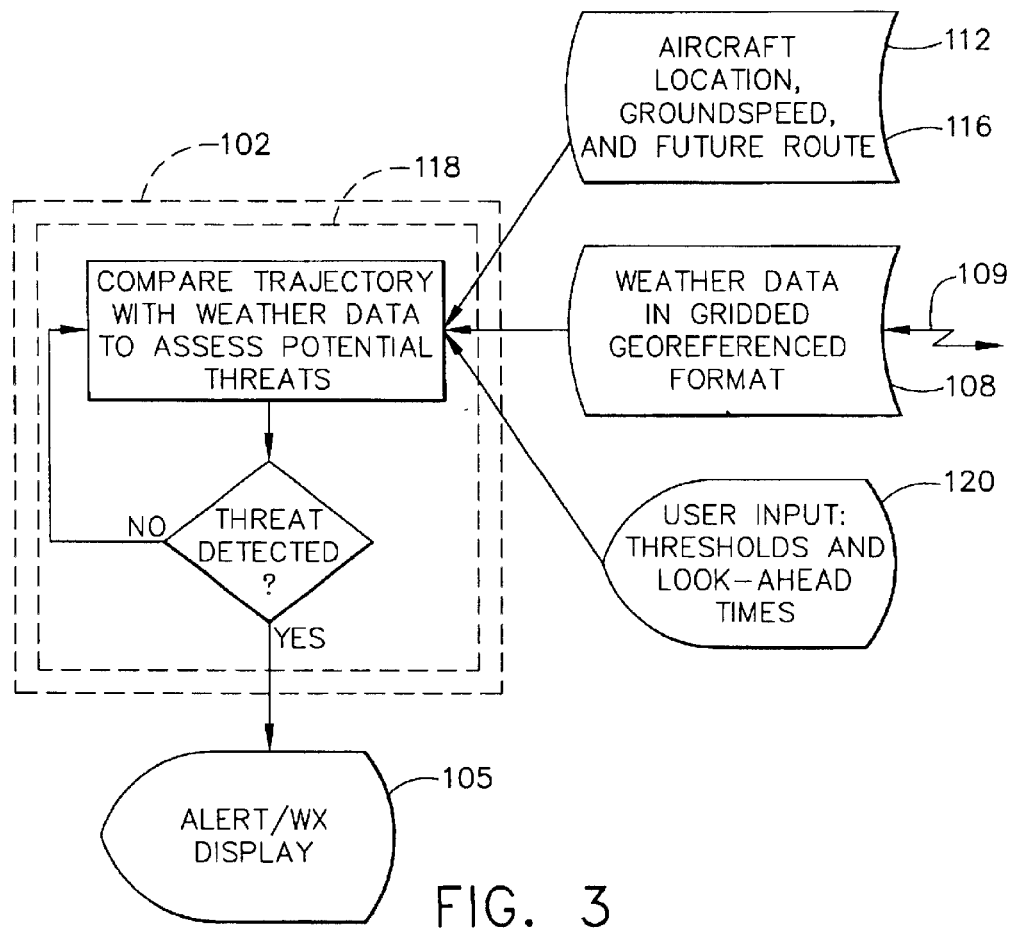
FIG. 3. is a flow chart and schematic of an algorithm that may be used in practicing the instant invention.

FIG. 3. is a flow chart and schematic of an algorithm that may be used in practicing the instant invention.

A processor 102 has a software (or firmware) based algorithm or process 118 in accordance with the invention. The aircraft location, groundspeed, and future route are continuously made available to the process 118. The future route may be provided by a navigation database 112 or may be entered manually by the aircraft crew. The location and groundspeed of the aircraft may be provided by sensors such as inertial sensors or by a GPS 116.

Weather data in gridded geographical references is also provided to the process 118. This weather information may be obtained from a ground-based source or a satellite source by means of an electronic data link between the source and the airborne processing equipment. The weather data may be provided in several sets, each set carrying data related to a different weather condition or threat. For example, some commonly provided condition or threat data are convection, turbulence, precipitation, and icing. Each separate data set is provided with a geographic coordinate and a level indicating the severity of the condition. Thus each geographic position within a grid of interest has associated with it a data point with a representation of the severity of the particular weather feature selected. The weather data may be provided at different update rates for different weather data sets.

An aircraft crew can provide an input 120 to the process 118 that indicates a parameter of interest. For example, "turbulence greater than level two to be encountered within one hour" or "thunderstorms of severity two or greater 30 minutes prior to encounter". Alternatively, the threat thresholds maybe preset.

The process 118 is performed by processor 102 that predicts the future geographic location and time of arrival at that location by the aircraft at discrete intervals along the expected route of flight. At each location a comparison is made between the weather data sets' numeric severity values and the corresponding alert threshold entered by the crew. If the severity of a data set exceeds its corresponding threshold as entered by the crew, and alert is created for this data set.

When the alert is created the display 105 (in those systems where a weather display is used that is separate from the multifunction display of FIG. 1) is activated. In this way, the display is not constantly active such that it may interfere with the concentration of the crew by displaying bright, colorful displays when the data to be displayed is not critical.

In the case of an integrated display system as set forth in FIG. 1, the display 104 switches from the currently operating mode, perhaps navigation or terrain display, to display the critical weather threat and thus calling the crew's attention to the threat only when it is within the parameters set by the crew.

In either case the processor 102 may issue an alert in addition to activating the display, for example an audible alert may be issued by an annunciator (not shown) to alert the crew to evaluate the weather threat.

Figure 4:
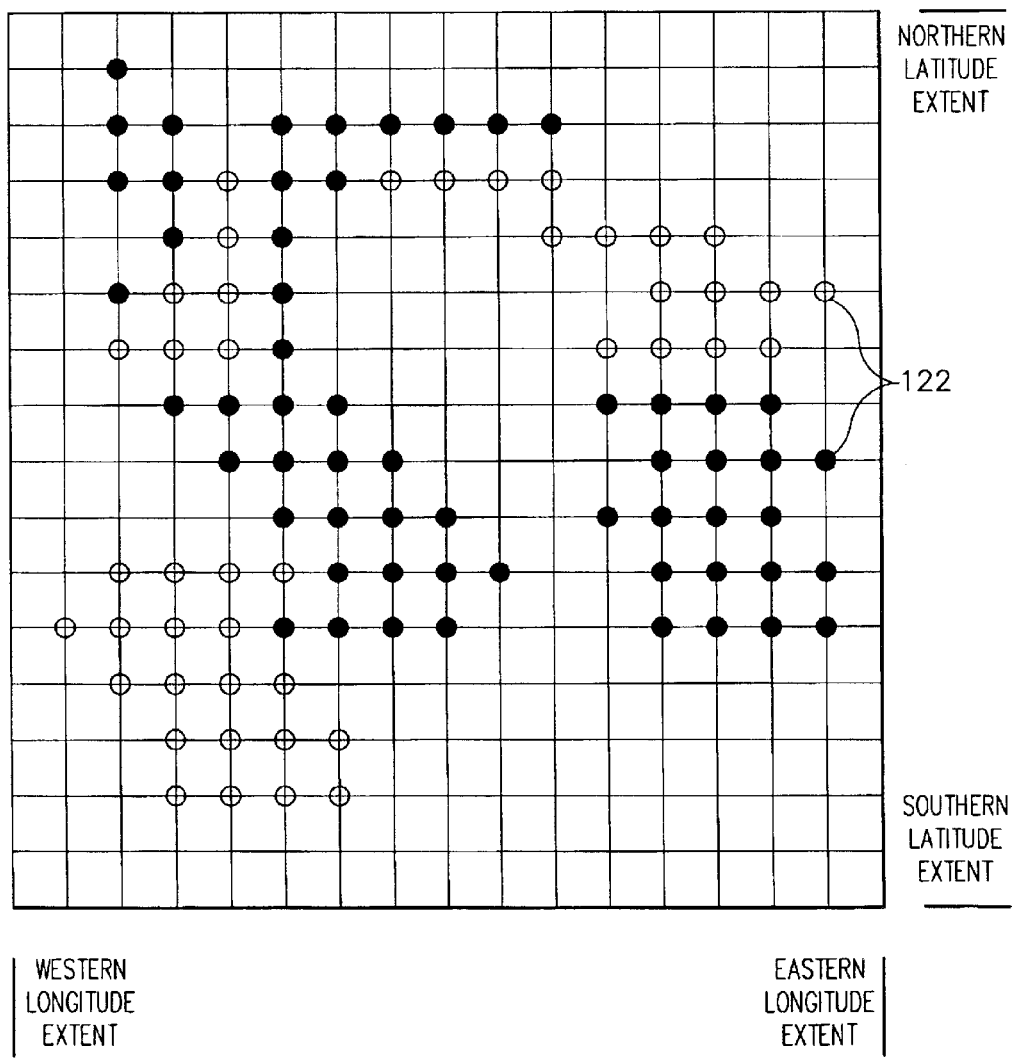
FIG. 4. is a depiction of certain weather data geographically gridded in accordance with the instant invention.

FIG. 4. is a depiction of certain weather data geographically gridded in accordance with the instant invention.

As discussed above, weather conditions that can pose a major threat to an aircraft include turbulence, icing, precipitation and regions of convection activity. Such data sets are available in a gridded format and can be communicated to appropriate airborne equipment for processing and display.

A gridded data set is a stream of numerical values preceded by a header that holds the key to the interpretation of the numerical data. The header of the file would typically comprise, for example, geographic North, South, East, and West boundaries of a square incorporating the region of interest. Using the key data, the numerical data can be reconstructed to form a rectangular matrix of points, each point being at a known latitude and longitude and having a numerical value that relates to some characteristic of the weather (usually severity).

FIG. 4 depicts a typical geographically gridded data set. Each grid point 122 has a numerical value representing a characteristic of the weather it represents. The numbers are usually represented as color values for display.

Figure 5:
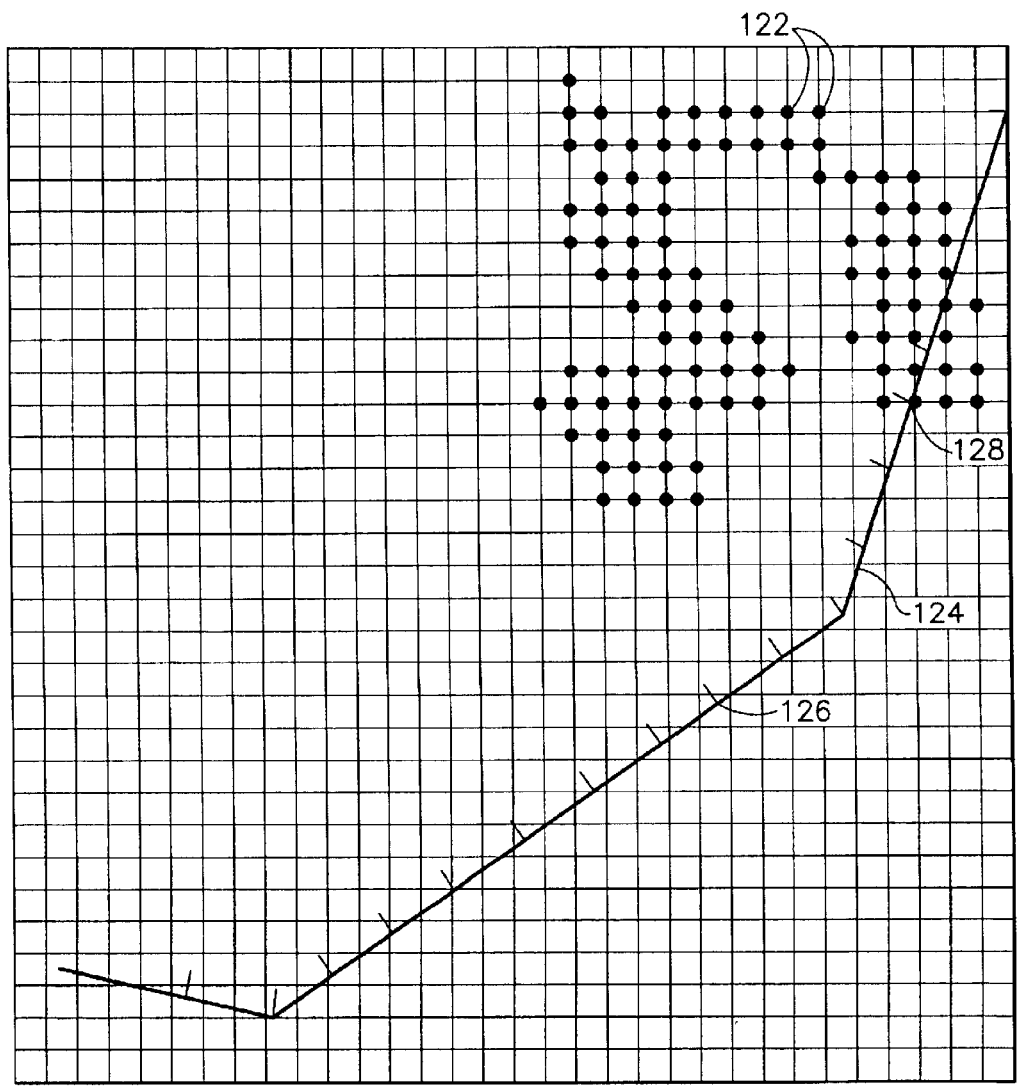
FIG. 5. is a depiction of certain weather data together with a flight plan track indicating a potential weather threat.

FIG. 5. is a depiction of certain weather data together with a flight plan track indicating a potential weather threat. Grid points are shown at 122. Since the weather data is geographically referenced, an exact match with aircraft state (position, altitude, and ground speed) and future route can be made. An algorithm within process 118 advances the predicted aircraft position from current location along the intended route of flight 124. The estimated time of arrival of the aircraft is estimated at regular points 126 along the flight plan. At each point, the latitude and longitude of the point is determined and every weather data set for which a watch has been set is examined at that geographical location. If any one of the weather watch thresholds is met or exceeded, an alert is made. For example, the intersection of the intended flight path of the aircraft and a weather pattern exceeding the set threshold is indicated at 128 in FIG. 5.

While a display alert system and process has been described for monitoring severe weather, other threats may be monitored in a similar manner. For example, a terrain height monitor may use data from terrain database 106 in conjunction with position and ground speed data from sensors 116 and flight plan data from navigation data base 112 to provide an alarm some period of time prior to the aircraft entering terrain higher than the flight plan altitude.

From the foregoing detailed description of preferred exemplary embodiments, it should be appreciated that apparatus and methods are provided for depicting weather or other threats on a vehicle display.

While preferred exemplary embodiments have been presented in the foregoing detailed description of preferred exemplary embodiments, it should be appreciated that a vast number of variations exist. It should also be appreciated that these preferred exemplary embodiments are only examples, and are not intended to limit the scope, applicability, or configuration of the invention in any way. Rather, the ensuing detailed description will provide those skilled in the art with a convenient road map for implementing a preferred embodiment of the invention, it being understood that various changes may be made in the function and arrangement of elements described in an exemplary preferred embodiment without departing from the spirit and scope of the invention as set forth in the appended claims.

What is claimed is:

1. A method for operating a threat-warning display for a vehicle, comprising:
   obtaining real-time threat information from a source of threat information,
   calculating the present position, heading and speed of the vehicle,
   calculating whether at the present position, heading, and speed, the vehicle will encounter a threat of at least a predetermined severity level, and
   displaying the threat on a display screen only when (i) the vehicle will encounter the threat and (ii) the threat is of at least a predetermined severity level.

2. A method as set forth in claim 1 wherein the threat is a weather threat.

3. A method as set forth in claim 2 wherein the display is inactive when the weather is not being displayed.

4. A method as set forth in claim 2 wherein the display is a multifunction display and is used to display other data when the weather is not being displayed.

5. A method as set forth in claim 2 wherein the weather threat is a threat taken from the group of turbulence, precipitation, convection, and icing.

6. A method as set forth in claim 5 wherein threat information includes severity level data.

7. A method as set forth in claim 6 wherein the display screen displays threats of at least the predetermined severity only if the vehicle will encounter the threats within a predetermined period of time.

8. A method as set forth in claim 1 wherein the predetermined severity level is determined by an operator of the vehicle.

9. A method as set forth in claim 8 wherein the display is inactive when the weather is not being displayed.

10. A method as set forth in claim 8 wherein the display is a multifunction display and is used to display other data when the weather is not being displayed.

11. A method for operating an aircraft cockpit weather threat display system in an unobtrusive manner, the display system having a source of real-time weather data including the geographical position of weather of a level constituting a threat to the aircraft, a source of flight data including present position, speed, and planned course of the aircraft, a processor for processing weather and flight data, and a display for selectively displaying weather threats, comprising:

using the flight data to calculate the position of the aircraft over a predetermined time, comparing the position of the aircraft with the real time weather data to determine whether the aircraft will encounter a weather threat, and displaying the weather threat on a display only when (i) the vehicle will encounter the weather threat and (ii) the weather threat is of a predetermined severity level.

12. A method as set forth in claim 11 wherein the real time weather data is in a gridded format, the grid covering an area of interest.

13. A method as set forth in claim 12 wherein the position of the aircraft is calculated within the area of interest.

14. A method as set forth in claim 11 wherein the display is inactive when a weather threat is not being displayed.

15. A method as set forth in claim 11 wherein the display is a multifunction display and is used to display other data when a weather threat is not being displayed.

16. A method as set forth in claim 11 wherein weather threats of at least the predetermined severity level are displayed only if the aircraft will encounter the weather threats within a predetermined period of time.

17. A method as set forth in claim 16 wherein the predetermined time is set by a crewmember.

18. A method as set forth in claim 11 wherein the predetermined severity level is determined is by a crewmember.

19. A method as set forth in claim 11 wherein the source of real time weather data is accessed through a telecommunications link.

20. A method as set forth in claim 19 wherein the source of real time weather data is a ground-based source.

21. A method as set forth in claim 19 wherein the source of real time weather data is a satellite-based source.

22. A method as set forth in claim 13 wherein when a weather threat is displayed, it is displayed in color, different colors indicating different severity levels.

23. A method as set forth in claim 16 wherein the predetermined time is established by a crewmember.

* * * * *

UNITED STATES PATENT AND TRADEMARK OFFICE
CERTIFICATE OF CORRECTION

PATENT NO. : 6,865,452 B2
APPLICATION NO. : 10/233029
DATED : March 8, 2005
INVENTOR(S) : David Burdon It is certified that error appears in the above-identified patent and that said Letters Patent is hereby corrected as shown below:

Please insert the following at Column 1, Line 4, as the first sentence of the specification: This invention was made with Government support under Contract NCC1-288 awarded by NASA. The Government has certain rights in this invention.

Signed and Sealed this

Fifteenth Day of August, 2006

JON W. DUDAS
*Director of the United States Patent and Trademark Office*